United States Patent [19]
Raman

[11] Patent Number: 5,748,186
[45] Date of Patent: May 5, 1998

[54] MULTIMODAL INFORMATION PRESENTATION SYSTEM

[75] Inventor: T. V. Raman, Cambridge, Mass.

[73] Assignee: Digital Equipment Corporation, Maynard, Mass.

[21] Appl. No.: 537,563

[22] Filed: Oct. 2, 1995

[51] Int. Cl.[6] .................................................. G06T 1/00
[52] U.S. Cl. ........................................ 345/302; 707/501
[58] Field of Search ............................... 395/154, 145, 395/160, 776, 777, 774, 327, 806, 807; 345/302, 327; 707/500, 514, 515, 513

[56] References Cited

U.S. PATENT DOCUMENTS

| | | | |
|---|---|---|---|
| 4,569,028 | 2/1986 | Best | 395/327 |
| 4,751,740 | 6/1988 | Wright | 382/180 |
| 4,827,520 | 5/1989 | Zeinstra | 395/2.84 |
| 5,404,443 | 4/1995 | Hirata | 395/327 |
| 5,420,974 | 5/1995 | Morris et al. | 395/154 |
| 5,504,891 | 4/1996 | Motoyama et al. | 395/774 |
| 5,555,362 | 9/1996 | Yamashita et al. | 395/145 |
| 5,557,722 | 9/1996 | DeRose et al. | 395/148 |
| 5,579,519 | 11/1996 | Pelletier | 395/705 |

*Primary Examiner*—Joseph H. Feild
*Attorney, Agent, or Firm*—Dirk Brinkman; Stuart D. Dwork; Alfred A. Stadnicki

[57] ABSTRACT

In a computer system, a method is implemented for interactively presenting electronically encoded multi-media information. The information including marks to indicate a structure of the information. The method includes the steps of receiving the information, and converting the information to a common intermediate representation stored in a memory of a computer system in the form of a hierarchical attribute tree. The tree has a plurality of document objects, the document objects represent the information, the structure of the information, and procedures which can operate on the information. The common intermediate representation is presented using a plurality of user communication modalities according to the hierarchical attribute tree. While presenting the information, the method receives control signals from a user using the plurality of user communication modalities to enable the user to interactively and independently control the receiving of the information and the presentation of the information in a plurality of presentation modalities.

26 Claims, 5 Drawing Sheets

FIG. 1

```
310 ~ < html >
320 ~ < head >
330 ~ < title > Source Documant < /title >
350 ~ < /head >
360 ~ < body >
       < H1 > Author < \H1 >
361 ~ < p >
362 ~ < address) > Internet:author@crl.dec.com <br >
       Digital, Maynard MA < br >
       < p >
       < blockquote >
       you can find text at
380 ~ < A HREF = "http//www.crl.dec.com/home.html" >
381 ~ Home page < /A >
       (If you ask the right question)
       < HR
390 ~ < /body >
391 ~ < /html >
```

```
410 ~ { html
420 ~ { head
430 ~ { title { Source Document }}
       }
460 ~ { body
       { h1 { Author }}
461 ~ { paragraph
462 ~ { address
       { text Internet: { author@com.dec.com }}
       }
       { blockquote
       { text You can find text at }
       { anchor { attributes
480 ~ { HREF - "http://www.crl.dec.com / home.html"
       }}
481 ~ { text Home page }}
       }
       }
       }
```

MULTIMODAL INFORMATION PRESENTATION SYSTEM

FIELD OF THE INVENTION

This invention relates to information presentation systems, and more particularly to systems where the information is available electronically.

BACKGROUND OF THE INVENTION

Currently, there is an increasing trend to present information in a form which has become known as "multimedia." For example, in the Internet, and more specifically in the "World-Wide-Web," (WWW), in short the "web," information can be visually presented as text, icons, color graphic images, both still and moving.

As an additional characteristic, the information can be manipulated interactively as it is being presented. This manipulation of the information is colloquially known as "surfing the net." A user, while reviewing the information, identifies specific content of interest. In response, the systems presents information related to the specific content. The user interaction with the information, in most systems, is via devices which require visual contact, for example, display monitors and pointing devices of computer systems.

A standard encoding scheme for multi-media information uses what is known as "hyper-text markup language." Information encoded according to this standard is easily recognized by the file postfix designation ".html,". This designation is familiar to users of WWW retrieval and presentation systems such as Netscape, and Mosaic.

Hyper-text includes "marks" which define the structure of the information in the source document. For example, the text may include structural marks which indicate headers, titles, sections, paragraphs, "bullets," and so forth. The marks are used to visually format the information while it is being presented. For example, section headers may be bolded and paragraphs can be separated by line breaks and indentations.

As an additional feature, the text can include words or phrases which are called anchors or links. The links are associated with pointers to other documents. The user can retrieve these other documents simply by pointing and clicking at the links using, for example, a mouse.

There are problems with the prior systems that interactively manipulate multi-media information. In the known systems, the methods used to encode, retrieve, and present the information are tightly coupled. This means that the information of the source document is presented exactly as indicated by the structural marks. In addition, the information is usually presented assuming some predetermined presentation modality, usually visual. For example, if the information is encoded to be textual, the system simply presents the text on a monitor screen in a manner where the structure of the text, e.g., titles, sections, and paragraphs are immediately visible.

As an additional problem, the user can only scroll forwards or backwards through the information in a linear manner using, for example, a cursor or slide bar. In most systems, the user cannot review the presented material according to the marked-up logical structure of the source document. The currently known integrated encoding, retrieval, and presentation systems, such as Mosaic and Netscape, do not permit structure or context based browsing. In other words, current systems, which render "on the fly," generally assume a singular integrated encoding, retrieval and presentation modality.

This assumption may frequently be wrong. For example, many currently available computing devices, which could be used to surf the web, such as "palm-top" computers, or hand-held personal digital assists (PDAs) have limited display capabilities. Also, the most widely available communication device, the telephone, can not be used at all to surf the web. Furthermore, certain environments may preclude visual presentation. Also, certain users may prefer to have some, if not all of the source document information presented in anything but visual form, no matter what the encoding.

Therefore, there is a need for an information presentation system which allows a user to control the modalities of presentation. In addition, the system should allow the user to view the information using the underlying structure or logical organization of the information.

SUMMARY OF THE INVENTION

In a computer implemented method, a system can interactively present electronically encoded multi-media information in a plurality of presentation modalities. The information including marks to indicate a structure of the information. The method includes the steps of receiving the information, and converting the information to a common intermediate representation independent of any one of the presentation modalities.

The common intermediate representation is stored in a memory of a computer system in the form of a hierarchical attribute tree. The tree has a plurality of document objects. Each document object represents the information, the structure of the information, and procedures which can operate on some structural element of the information. The common intermediate representation is presented using a plurality of user communication modalities according to the hierarchical attribute tree.

While presenting the information, the method receives control signals from a user using the plurality of user communication modalities. The control signals enable the user to interactively and independently control the receiving of the information and the presentation of the information in a plurality of presentation modalities.

As an advantage, the user can browse through the document taking the structure of the document into consideration. In addition, the user can control the presentation modality that is being used to render the document. Since the intermediate representation is common to any of the presentation modalities, it is possible to switch among different presentation modalities while the information is being rendered. It is also possible for the user to select a presentation modality, for example, aural, even if the original encoding of the information assumed a visual presentation mode.

BRIEF DESCRIPTION OF THE DRAWINGS

FIG. 3 shows marked-up hypertext;

FIG. 4 shows the text of FIG. 3 as a nested list; and

DETAILED DESCRIPTION OF A PREFERRED EMBODIMENT

Figure 1:
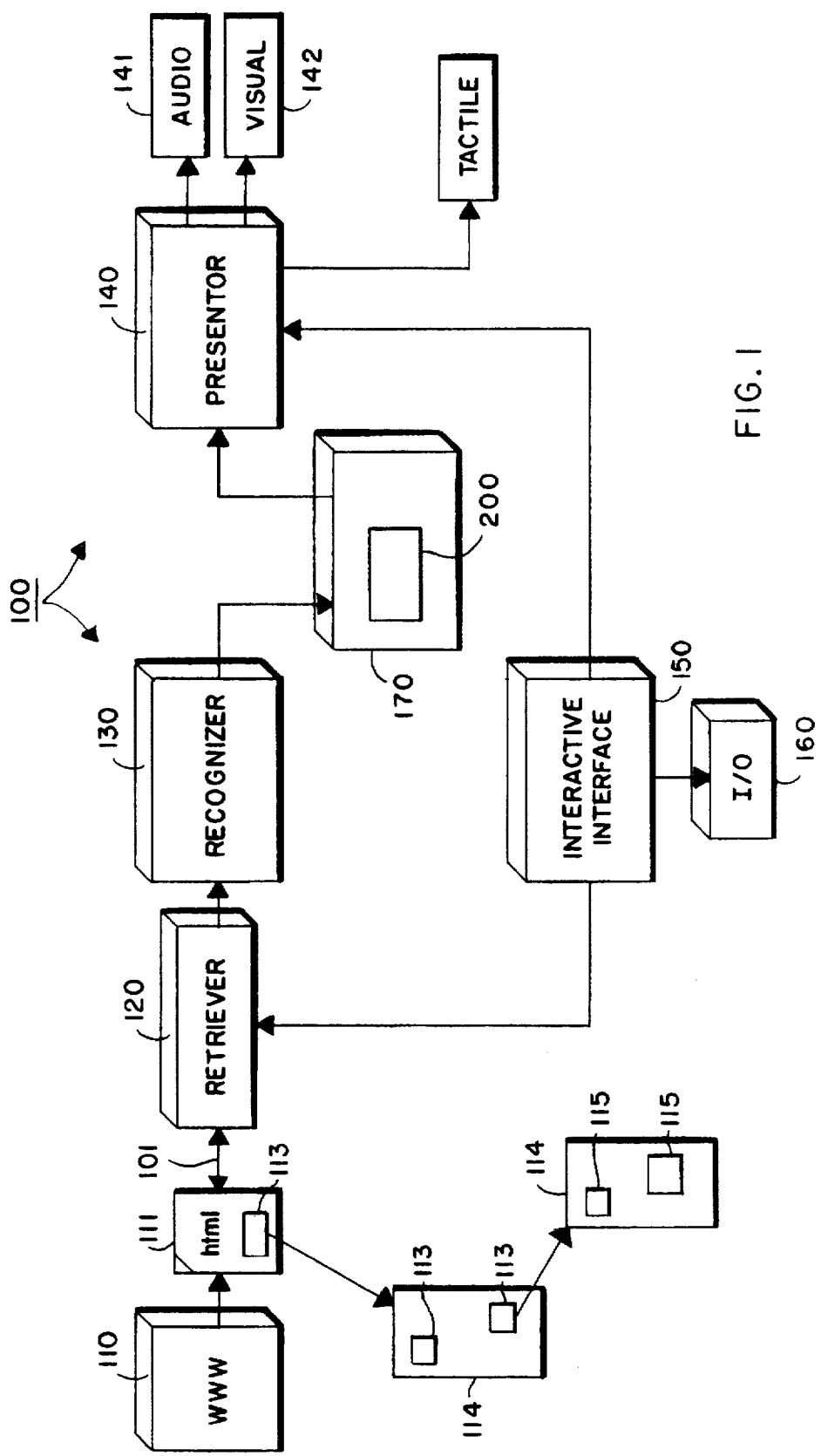
FIG. 1 is a top-level block diagram of the multimodal presentation system according to a preferred embodiment of the invention.

Now with reference to the drawings, FIG. 1 shows a multimodal information presentation system 100 according to a preferred embodiment of the invention. The system 100 includes a source 110 of information. The source 110 electronically encodes the information in a source document 111. The source document 111, in response to user requests, can be accessed using a retriever 120.

A recognizer 130, coupled to the retriever 120, converts the information 111 into a common intermediate high-level logical data structure 200 stored in a memory 170. A presentor 140 can convert the common intermediate structure 200 into multimodal presentations as directed by the user. For example, the common structure 200 can be presented as aural information 141, visual information 142, or tactile information 143. The aural information is "spoken" by a speech synthesizer, the visual information can be displayed on a monitor, and the tactile information can be in the form of Braille patterns.

If the information to be presented is already in speech form, then a presentation modality can be a visual cartoon character "mouthing" the words to enable a person who can lip-read to follow the speech.

In one embodiment of the invention, multiple presentation modalities can be concurrently presented. In this case, the multiple renderings can be synchronized with each other. In addition, according to the preferred embodiment, the information can be presented as different "views." For example, the presentation can reflect the entire source document 111, or an outline, a summary, or selected portions thereof. For example, selected portions can be the first and last sentences of paragraphs.

An interactive interface 150 coupled to I/O devices 160 can be used to control the retriever 120 and the presentor 140. The I/O devices 160 can include a monitor, a keyboard, a mouse, a telephone key-pad, a voice input unit coupled to a speech recognizer, and a speech synthesizer.

The source document 111 can be located at a World-Wide-Web (WWW) remote client computer site connected to the system 100 by a communications network 101, for example, the Internet. Alternatively, the source can be local to the components of the presentation system 100. The information 111 can be in the form of hyper-text mark-up language conforming to, for example, the standard HTML2.0. Electronically encoded files containing information encoded in this manner are conventionally recognized by a file prefix "html." Hyper-text source documents possess a rich structure in a form generally known as directed acyclic graphs.

Characteristically, the source document 11, in addition to text, can include anchors or "links" 113 and "forms" 115. In part, it is the links and forms that make the text interactive. The links 113 are associated with addresses, or pointers to other information 114. The pointers can be in the form of universal record locators (urls). The address of the first or "home" page of a particular set of connected information is called the basepath. The linked other information 114 can be located at any WWW site.

In the prior art, the links 113 are usually words, phrases, or icons visually highlighted in a different color or font so that they can be easily distinguished from the rest of the text as the text is displayed. Typically, the user points and "clicks" on the links 113 to retrieve the other information 114. These operations of pointing and clicking are known as browsing or "surfing" the web.

Known encoding, browsing, and rendering systems are usually tightly coupled, and generally assume a visual interaction. As stated above, in certain situations, the user may want to decouple the browsing from the encoding, and the rendering from the browsing. In addition, the user may desire presentation modalities other than visual. Therefore, in the preferred embodiment of the invention, the user can select to present the document or specific portions of the document, such as the links, using an aural presentation style.

For example, in an aural mode, the presentor 140 can vary the speech while "speaking" the document. Variation of the speech can include amplitude, pitch, frequency, attenuation, resonance, and directionality. For example, if the link is known to be at a distant WWW client site, a link can be spoken to indicate a source far away.

In addition, the presentation can momentarily pause on the links so that the user can select the link using a mouse, a keyboard, or a voice input unit. In an alternative outline presentation, only the links 113 could be presented. As an advantage over the prior art, this would allow the user to rapidly locate and retrieve desired information without being burdened with listening to or reviewing extraneous text. Once the desired information is located, the full text, or portions of the full text can be presented.

The forms 115 are used to conduct a dialogue with the user. In the preferred embodiment of the invention, the user can select to interact with the forms 115 using speech. For example, the forms 115 can be used to get a stock or a financial transaction. The system can say the prompts of the transaction, and the user input can be processed by the speech input unit of the I/O 160.

The retriever 120, in cooperation with the interactive interface 150, selects information to be presented by the presenter 140. The retriever 120 and interactive interface 150 can include navigational procedures such as are found in Mosaic and Netscape. However, whereas the prior art navigators retrieve and present information on the fly, the system of the present invention, as an advantage, can perform the retrieval and presentation of the information 111 as separate steps, and the rendering style can be more than just visual.

Typically, the source document 111 is received by the retriever 120 as a sequential stream of digitally encoded signals, for example ASCII characters. The characters encode the text as well as the marks placed in the text to define the structure of the document 111; see FIG. 3 for description.

The recognizer 130 parses the character stream into fundamental source elements, for example, title, sections, sub-sections, paragraphs, sentences, links, and forms, and so forth. The elements are stored in the intermediate high-level data structure 200. Variations in writing styles, and ambiguities in the use of the markup language make the extraction of the high level structure 200 difficult. The recognizer 130 uses a lex-based translator to generate a nested list representing the source document 111; see FIG. 4 for description.

Figure 2:
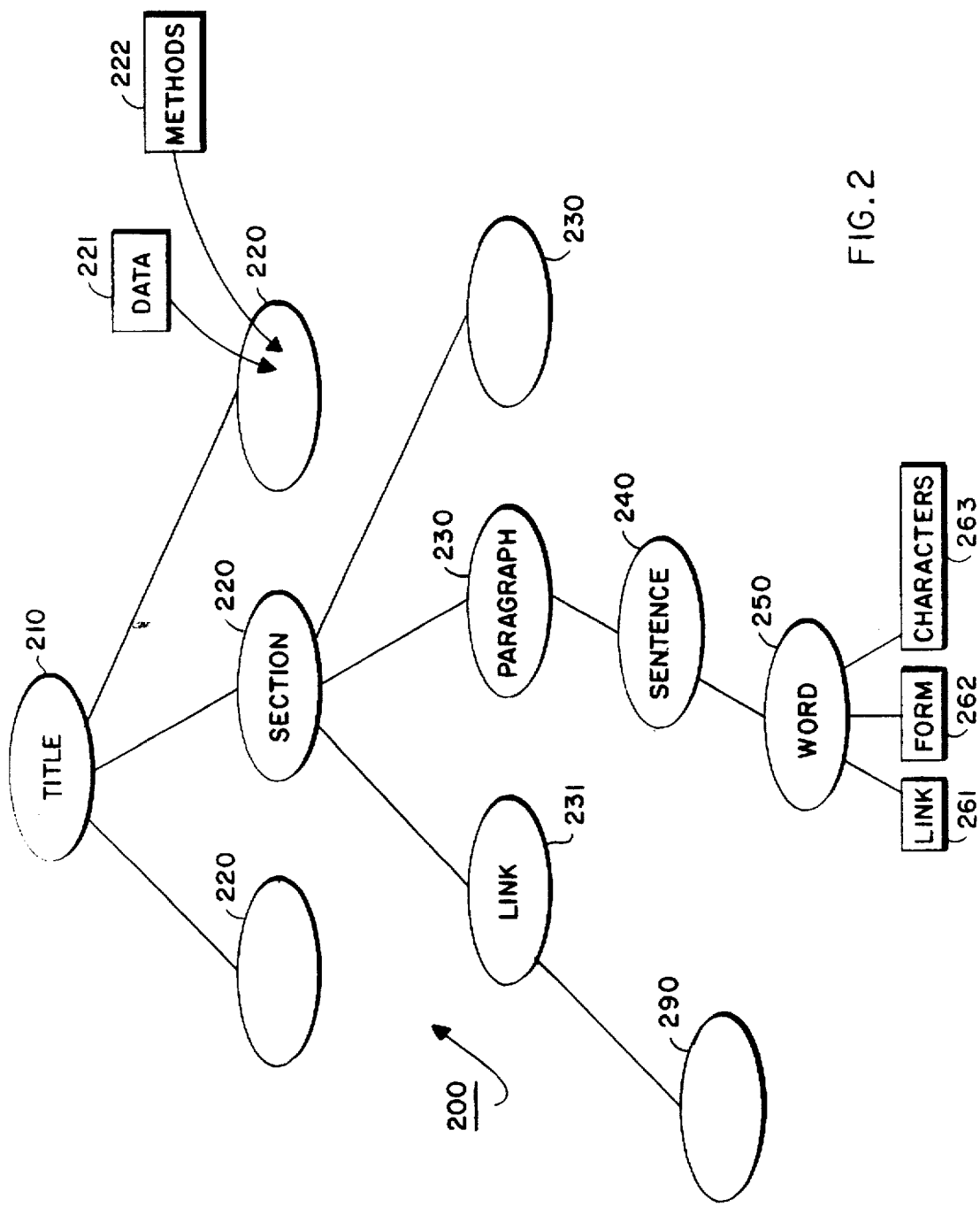
FIG. 2 is a diagram of multi-media information encoded in a hierarchical tree as attribute objects.

As shown in FIG. 2, in the preferred embodiment, the nested list can be logically shown as a data structure in the form of a hierarchical attributed tree. The tree 200 is shown in the usual upside down manner with the root at the top, and the leaves at the bottom. The tree 200 includes a plurality of nested containers or nodes. Each node encapsulating a specific portion and type of document content. Each node or container is known as a document object. An object is an encapsulation of data 221, and methods 222 which operate on, or according to, the data.

All objects in the representation are strongly typed in accordance with the object oriented style of implementing the system 100.

Each object or node encodes a fundamental element or unit of the source document 111 as parsed by the recognizer 130. The top node 210 is known as the root of the tree. The document object represented by this node is the entire document. Connected to the root are descendant nodes 220, which in turn defined sub-trees. The nodes 220 can reference additional nodes 230, 240, and 250. At the bottom of the tree are leaves 261–263 where the actual content or characters and graphics, e.g., icons etc., of the source document 111 element are stored.

Document objects can represent links and forms. If the user selects another document referenced by a link document object, the nodes 290 of the selected other document become a sub-tree of the node 231 representing the link document object. For many levels of document nesting, higher levels of the tree 200 may be collapsed into a single node in order to reduce storage space. This single node may later may be expanded again if the user wants to present text of the previously collapsed higher nesting levels of the document.

The data of a document object can include attributes which describe and type the underlying element of the parsed source document represented by the object. Different rendering methods can be applied to objects depending on the type of the object. For example, the methods used to visually render a paragraph, link, or form object on a display screen are quite different than the methods used to aurally render the object using a speech synthesizer. Rendering methods for various document elements can be collected as a style. Thus, a style is a predetermined collection of methods to render various document elements.

The leaf nodes 261–263 represent the actual document content, e.g., the words that make up the body of the parsed text. For example, if the object represents a paragraph, the underlying content includes the words of the sentences. If the element represented by the node is a form, the content can be the prompts of the form.

Navigational methods associated with objects allow the user to browse through the text taking the underlying structure of the document 111 into consideration. As an advantage, the object can be rendered or viewed in a plurality of presentation modalities, e.g., visible, audible, tactile. Multiple modalities can be presented concurrently in a synchronized manner, and according to a predetermined style to facilitate the comprehension of the presented information.

FIG. 3 shows a sample source document 300 which can be retrieved, recognized, and presented by the system 100 according to the invention. The text element <html>310 indicates that this document is marked-up according to the HTML2.0 standard. Although this specific example of the preferred embodiment is described with reference to html, it should be understood that the invention can also be worked with other mark-up conventions, such as the ISO standard general mark-up language sgml, which similarly partitions the source document into structural elements.

The element <head> 320 indicates that a document header follows. The element <title> indicates that the following characters represent a title, e.g., Source Document, and the element </title> 340 indicates the end of the title element. The element </head> 350 indicates the end of the heading element. The sections <body> 360, <P> 361, and <ADDRESS> 362 denote distinct structural components of the document. The elements <A HREF="http://www.crl.dec.com/personal/raman/home.html">380, and Home page </A> 381 indicate a link to additional information. The link here is in the form of a WWW network address, also known as universal record locator (url). The elements </body> 390, and </html> 391 respectively denote the endings of the text body and the entire document.

FIG. 4 shows an example nested list 400 which is the output of the recognizer 140 of FIG. 1. The items of the list 400 designated with reference numerals 410, 420, 430, 460, 461, 462 respectively correspond to elements 310, 320, 330, 360, 361, 362 of FIG. 3. The items 480 and 481 encode the attributed link elements 380 and 381. In FIG. 4, the relative left-to-right indentations of the braces indicate the level of nesting of the items of the list 400. The level of nesting, in turn, corresponds to the depth of the nodes using the tree representation of FIG. 2. The "text" item of the list 400 encode is an example of content that can be stored in a leaf node.

Figure 5:
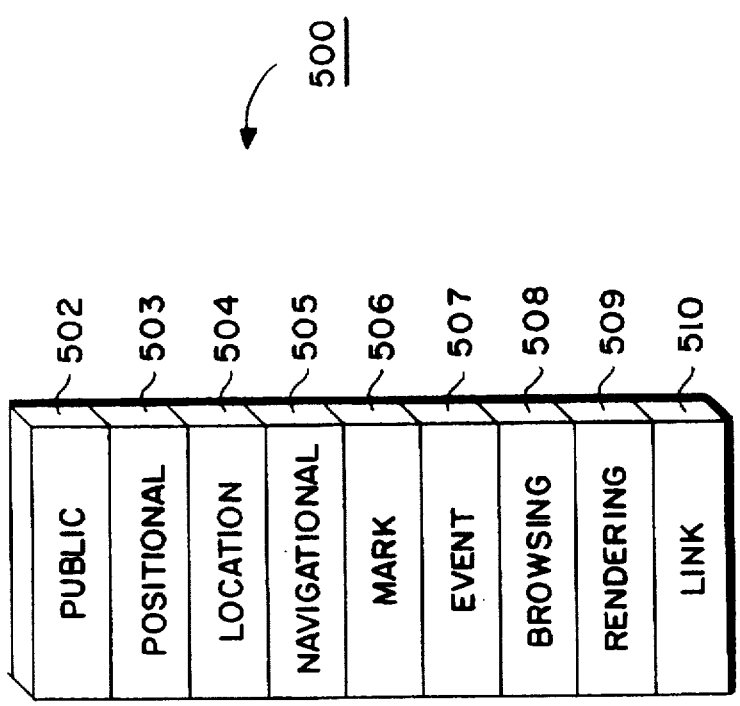
FIG. 5 is a block diagram of procedures for operating on a document during rendering.

Preferred methods 500 which can operate during the rendering of a document are described with reference to FIG. 5. The rendering methods 500 include public 502, positional 503, location 504, navigational 505, marking 506, event 507, browsing 508, rendering 509, and link 510 methods.

The location of the current document element or node that is being rendered is maintained in a location vector. Also included is the url of the current document, e.g., the base-path. In addition, the methods 500 use a push-pop position stack and an event queue. The position stack is used to maintain positional information, and the event queue stores events or control signals to be processed. Control signals or events can include key strokes, mouse clicks, or other user input, including recognized speech. Events can have associated priorities. An event with a higher priority may pre-empt the processing of lower priority events.

Public methods

The public methods 502 include configurate, construct, and destruct methods. The public methods 502 are accessible to user routines. The configurate method is used to assign values to slots. A slot is a location associated with a document object to store a run-time variable. The configurate method isolates the encapsulated object variable from the external environment. The construct method creates a document object from a list element. The destruct method deletes a document object, including states of the object, and any storage associated with the object.

Positional methods

The positional methods 503 include position, current, children, base-path, and display methods. The positional method can be used to determine which document object, e.g., which node of the tree 200 is currently being processed for rendering. The position method returns positional parameters which describe the location of the current document object in the tree 200. The current method returns the content of the current document object. The type method returns the type of the current document object. The children method returns the children document objects of the current document object. The basepath method returns as a value the basepath (url) of the current document. The display method can be used to retrieve a value associated with a slot.

Location methods

The location methods 504 include find, goto, and move-to methods. These methods select a next document object to be rendered. The find method supplies attribute information, e.g., a field name, of a specified document object. The goto method makes an object of a specified type the next current object. The goto method can be used browse through the document. For example, the goto method can just present document objects of a particular type, e.g., links. The move-to method makes a specified node the current document object. Before moving to a specified node, the existence of a node at the specified position should be tested.

Navigational methods

The navigational methods 505 include top, next, previous, parent, and child, count_children, and count_sibling methods. The navigational methods modify the current position in the document as follows. The top method makes the root of the tree the current document object. The next method moves to the next document on the current level of the tree, e.g., the next right adjacent sibling node. The previous method makes the left adjacent sibling node the current document object. The parent method makes the parent of the current node the current document object. The child method moves down the tree, and makes the left-most node at that level the current document object. The count_children method returns as a value the number of children of the current document object. The count_siblings method returns the number of sibling nodes at the current level.

Mark methods

The mark methods 506 include push_mark, pop_mark, and swap methods 506. These methods can be used to mark current document objects of the tree, and to return to previously marked document objects. The push_mark method pushes the position of the current document object onto the stack. The pop_mark method pops the top position from the stack and makes the document object at that position the current document object. The swap method exchanges the current object with the top of the stack.

Event methods

The event methods 507 include bind, add, remove, and clear methods. The bind method is used to establish a binding of a presentation method to a document object for a particular event for the duration of the current rendering. The bind method, depending on an optional argument, can turn the binding on or off. The add_event method adds an event to the event queue for this document object. The remove_event method removes an event from the event queue for the current document object. The clear_events method deletes all events from the event queue of the current document object.

Browsing method

The browsing methods 508 are used to toggle execution control between the retriever 120 to allow browsing, and the presenter 140 to allow rendering. In addition, the browsing methods can be used to move from node to node.

Rendering method

The rendering methods 509 include prepare, render, and stop methods. The prepare method is a top-level procedure to clean up states, if any, of a previous rendering, and to prepare the current document object for rendering. The render method is used to render the current document object according to a selected presentation modality, or if none is specified, according to a current style. The stop method terminates rendering of the current document object.

Link methods

The link methods 510 include current_link, next_link, and previous_link methods. These methods are used to navigate through the document from link to link. If there is no current link, the next_link method returns the position of the first link, if any, of the current document.

Disclosed are illustrative embodiments of the invention described using specific terms and examples. It is to be understood that various other adaptations and modifications may be made within the spirit and scope of the invention. Therefore, it is the object of the appended claims to cover such all such variations and modifications as come within the true spirit and scope of the invention.

I claim:

1. A computer implemented method for interactively presenting an electronically encoded multi-media document, the document including marks to indicate a structure of the document, comprising the steps of:

receiving the document via a network;

converting the document to a common intermediate representation, the common intermediate representation stored in a memory of a computer system in the form of a hierarchical attribute tree having a plurality of document objects, the document objects representing the document, the structure of the document, and procedures which can operate on the document;

presenting the common intermediate representation using a plurality of user communication modalities according to the hierarchical attribute tree; and receiving control signals from a user using the plurality of user communication modalities, while presenting the common intermediate representation to enable the user to control the presentation of the document.

2. The method of claim 1 wherein the plurality of user communication modality include audible, visible, or tactile modalities.

3. The method of claim 1 wherein the plurality of user communication modalities are synchronized in the presenting step.

4. The method of claim 1 further comprising switching among the plurality of user communication modalities while presenting.

5. The method of claim 1 further comprising constructing a nested list, the nested list including a plurality of items, each of the plurality of items including data representing a structural element of the document.

6. The method of claim 5 wherein each of the plurality of items is stored as a document object in the hierarchical attribute tree.

7. The method of claim 1 wherein the plurality of documents objects include at least one of a link document object, the link document referencing a second document which can be received, converted, and presented.

8. The method of claim 1 wherein the procedures include navigational methods, location methods, and positional methods, the navigational methods for modifying a current position in the hierarchical tree, the location methods for selecting a current document object for rendering, and the positional methods for determining which of the plurality of documents is the current document object.

9. The method of claim 8 further including rendering methods, the rendering methods associated with the plurality of document objects to determine a rendering style for the common intermediate representation.

10. The method of claim 1, wherein:

the common intermediate representation is alternatively presentable using the plurality of user communication modalities and is presented using one or more user communication modalities selected from the plurality of user communication modalities; and the control signals received from the user represent a selection of the one or more user communication modalities and enable the user to interactively control the presentation of the document such that the document is presented only in the selected one or more user communication modalities.

11. A method for presenting a hypertext, comprising the steps of:

receiving the hypertext via a network, the hypertext including marks to indicate a visual rendering of the hypertext;

converting the hypertext to a common intermediate representation stored in a memory of a computer system;

presenting the common intermediate representation using an aural rendering.

12. The method of claim 11 further comprising:

presenting the common intermediate representation using the visual rendering, the visual rendering and the aural rendering synchronized with each other.

13. The method of claim 11 further comprising:

receiving speech input while presenting to interactively control the receiving and presenting.

14. An interactive system for presenting source information, comprising:

a converter configured to convert electronically encoded data representing the source information to a common intermediate representation of the source information;

a presenter configured to convert the common intermediate representation into a presentation of the source information to a user;

an input device configured to enter user commands to select one or more of at least two modalities in which the source information is presentable; and an interactive interface configured to receive a command entered on the input device and to issue a control signal representing the received command to the presentor, responsive to which the presenter controls the presentation of the source information in the selected one or more of the at least two modalities.

15. An interactive system according to claim 14, wherein the at least two modalities include at least two of a visual presentation modality, an aural presentation modality and a tactile presentation modality.

16. An interactive system according to claim 14, wherein the source information is aural and the selected one or more of the at least two modalities is a visual presentation modality.

17. An interactive system according to claim 16, wherein the presenter controls the presentation of the source information such that the source information is presented by displaying a mouthing of the aural source information.

18. An interactive system according to claim 14, wherein two of the at least two modalities are selected and the presenter controls the presentation of the source information such that the source information is presented concurrently in the selected two modalities.

19. An interactive system according to claim 14, wherein the at least two modalities include a partial presentation modality in which only a portion of the source information is presented.

20. An interactive system according to claim 14, wherein the source information is hyper-text.

21. An interactive system according to claim 14, wherein the at least two modalities include an aural presentation modality in which speech is variable.

22. An interactive system according to claim 14, wherein:

the input device includes a speech input unit;

the at least two modalities include an aural presentation modality; and with the aural presentation modality selected, interactivity between the interactive system and the user is accomplished using only speech.

23. An interactive system according to claim 14, further comprising:

a retriever for retrieving the source information;

wherein the input device is further configured to enter user commands requesting retrieval of the source information;

wherein the interactive interface is further configured to receive another command entered on the input device and to issue another control signal representing the received another command to the retriever, responsive to which the retriever retrieves the requested source information; and wherein the retrieval of the source information and the presentation of the source information are performed as separate steps.

24. An interactive system according to claim 14, wherein:

two of the at least two modalities are selected; and the presentor controls the presentation of the source information such that a portion of the source information is presented in one of the selected two modalities and another portion of the source information is presented in a different one of the selected two modalities.

25. An interactive system according to claim 14, wherein:

the common intermediate representation of the source information includes an intermediate high-level structure having a nested list in the form of a hierarchical attribute tree;

wherein higher levels of the hierarchical attribute tree are collapsible into a single node and expandable from the single node;

wherein a level of nesting of an item in said nested list corresponds to the level of a node associated with the item in the hierarchical attribute tree.

26. An interactive system for presenting source information, comprising:

a converter configured to convert electronically encoded data representing the source information to a common intermediate representation of the source information;

a presentor configured to convert the common intermediate representation into a presentation of the source information to a user:

an input device configured to enter user commands to select one or more of at least two modalities in which the source information is presentable; and an interactive interface configured to receive a command entered on the input device and to issue a control signal representing the received command to the presenter responsive to which the presenter controls the presentation of the source information in the selected one or more of the at least two modalities and the at least two modalities include an aural presentation modality in which speech is variable and farther wherein the speech is variable so as to indicate a relative distance between a source of the source information and the interactive system.

* * * * *